United States Patent
Slevin

(10) Patent No.: US 8,326,379 B2
(45) Date of Patent: Dec. 4, 2012

(54) DUAL MODE ELECTRONIC HEADSET WITH LOCAL AND REMOTE FOCUSED MICROPHONES

(76) Inventor: Richard S. Slevin, Los Altos Hills, CA (US)

( * ) Notice: Subject to any disclaimer, the term of this patent is extended or adjusted under 35 U.S.C. 154(b) by 0 days.

(21) Appl. No.: 13/481,920

(22) Filed: May 28, 2012

(65) Prior Publication Data
US 2012/0237052 A1 Sep. 20, 2012

Related U.S. Application Data

(63) Continuation of application No. 12/651,936, filed on Jan. 4, 2010, now Pat. No. 8,190,217.

(51) Int. Cl.
*H04M 1/00* (2006.01)
(52) U.S. Cl. .................................. 455/575.2; 455/90.3
(58) Field of Classification Search .............. 455/90.3, 455/550.1, 552.1, 553.1, 575.1, 575.2, 575.6
See application file for complete search history.

(56) References Cited

U.S. PATENT DOCUMENTS

| | | | |
|---|---|---|---|
| 6,408,194 B1 * | 6/2002 | Merker | 455/573 |
| 6,519,475 B1 * | 2/2003 | Kim | 455/557 |
| 6,922,473 B2 * | 7/2005 | Turnbull | 381/74 |
| 7,979,035 B2 * | 7/2011 | Griffin et al. | 455/90.3 |
| 8,046,033 B2 * | 10/2011 | Park et al. | 455/575.1 |

* cited by examiner

*Primary Examiner* — Nhan Le
(74) *Attorney, Agent, or Firm* — Patent Law Offices of Michael E. Woods; Michael E. Woods

(57) ABSTRACT

An electronic headset for a user, the headset including a housing; a first microphone to receive a first audio input provided by the user; a second microphone to receive a second audio input provided by one or more audio sources other than the user; a controller converting the first audio input into a first electronic signal when the controller operates in a first operational mode and converting the second audio input into a second electronic signal when the controller operates in a second operational mode; a first output system active in the first operational mode to communicate the first electronic signal to a second electronic device; a second output system active in the second operational mode and including a sound generator to convert the second electronic signal into an audio signal; and a mode control for setting the controller into one of the operational modes.

18 Claims, 1 Drawing Sheet

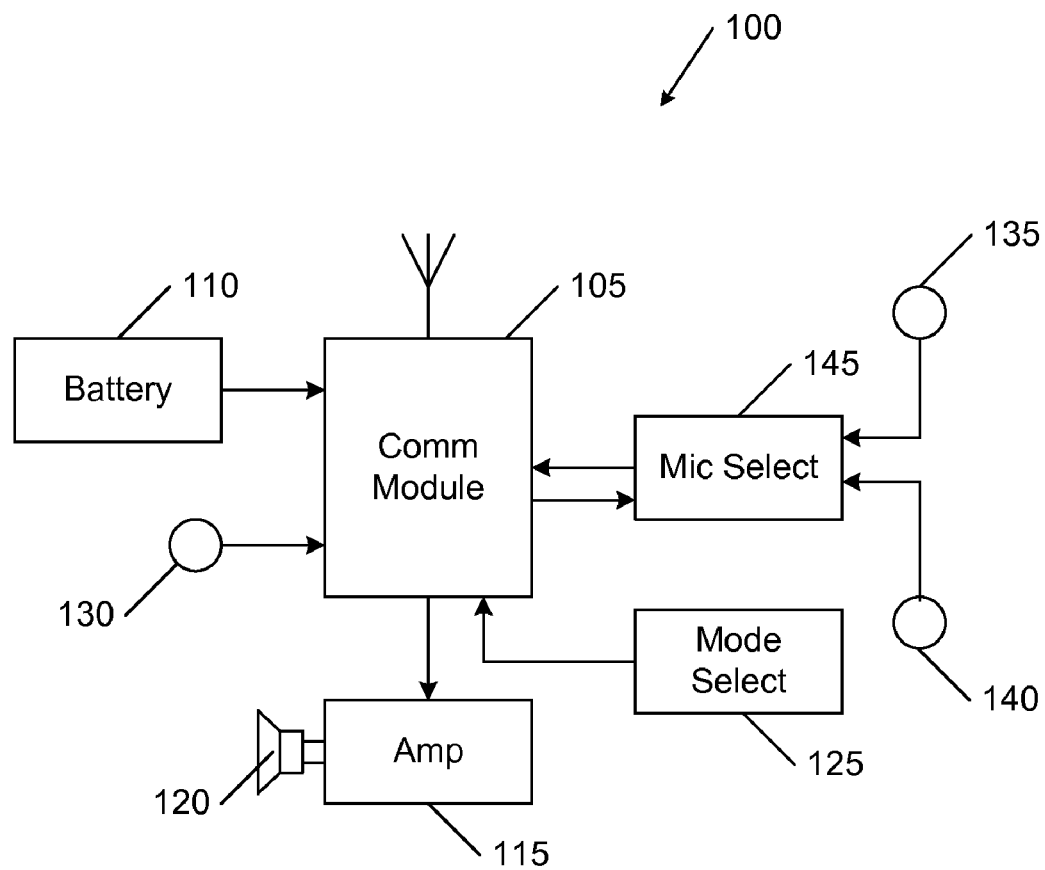

DUAL MODE ELECTRONIC HEADSET WITH LOCAL AND REMOTE FOCUSED MICROPHONES

CROSS REFERENCE TO RELATED APPLICATIONS

This application is a continuation of U.S. patent application Ser. No. 12/651,936, filed 4 Jan. 2010, the entirety of the contents the contents thereof expressly incorporated by reference thereto for all purposes.

BACKGROUND OF THE INVENTION

The present invention relates general to electronic headsets and more particularly to electronic headsets having audio enhancement capabilities.

There are other portable electronic devices that generate audio signals by use of headsets worn by users, such as cellular telephones, music players and the like. In addition to listening to signals from the electronic devices, it is not uncommon for users to be conversing through a microphone-equipped headset when operating the telephones. Sometimes these telephones are operated in noisy environments that increase a difficulty of participating in these conversations using the headset.

Not only do noisy environments contribute to increasing a difficulty of these telephone conversations using the headset, but it is also the case that direct conversations can be difficult in the noisy environments. Some users have degraded or enhanced sensitivity to certain frequencies that further influence the quality of telephone and direct conversations in a noisy environment.

What is needed is an electronic headset (and systems, methods, and computer program products) that improves remote (e.g., telephonic) and direct conversations conducted in a noisy environment.

BRIEF SUMMARY OF THE INVENTION

Disclosed is an electronic headset and audio enhancement method that improves remote and direct conversations conducted in a noisy environment. The electronic headset for mounting proximate a human ear of a user, the headset including a housing having a power source; a first microphone mounted within the housing to receive a first audio input provided by the user; a second microphone mounted within the housing to receive a second audio input provided by one or more audio sources other than the user; a controller converting the first audio input into a first electronic signal when the controller operates in a first operational mode and converting the second audio input into a second electronic signal when the controller operates in a second operational mode; a first output system active in the first operational mode to communicate the first electronic signal to a second electronic device separate and distinct from the electronic headset; a second output system active in the second operational mode and including a sound generator to convert the second electronic signal into an audible generated audio signal for sensing by the human ear; and a mode control coupled to the controller for setting the controller into one of the operational modes; wherein in the first operational mode speech from the first microphone is transmitted to the second electronic device from the first microphone; and wherein in the second operational mode audio information external to the wearer from the second microphone is provided into the human ear.

An audio enhancement method for operating an electronic headset mountable proximate a human ear of a user, the method including (a) receiving a first audio input provided by the user using a first microphone included within a housing of the electronic headset; (b) receiving a second audio input provided by one or more audio sources other than the user using a second microphone included within a housing of the electronic headset; (c) converting said first audio input into a first electronic signal when said controller operates in a first operational mode; (d) converting said second audio input into a second electronic signal when said controller operates in a second operational mode; (e) communicating said first electronic signal to a second electronic device separate and distinct from the electronic headset; (f) converting said second electronic signal into an audible generated audio signal for sensing by the human ear; and (g) setting the electronic headset into one of said operational modes; wherein in said first operational mode speech from said first microphone is transmitted to said second electronic device from said first microphone; and wherein in said second operational mode audio information external to the wearer from said second microphone is provided into the human ear.

The embodiments of the present invention provide for a dual-microphone electronic headset that serves as both a communication device for remote conversations and well as improving direct conversations, particularly in a noisy environment. The electronic headset has multi-modal operation in which different microphones are used, the different microphones focusing on different audio sources (e.g., one focuses on the wearer and another focuses at a relatively short distance of up to about 3-5 feet on a party that the wearer is conversing with). In the first mode, the wearer's audio is directed to another party (e.g., via a wireless transmission to a cellphone) and in the second mode the third party's conversation is directed to the wearer (e.g., a speaker mounted close the wearer's ear). Embodiments of the present invention include multiband equalizer to permit tuning the frequency response of the two conversations.

These and other advantages of the present invention will be evident upon a review of the application including the specification, drawing, and claims.

BRIEF DESCRIPTION OF THE DRAWINGS

FIG. 1 is a block diagram for a preferred embodiment of the present invention.

DETAILED DESCRIPTION OF THE INVENTION

The present invention relates to an electronic headset (and systems, methods, and computer program products) that improves remote (e.g., telephonic) and direct conversations, particularly conversations conducted in a noisy environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

FIG. 1 is a block diagram for a preferred embodiment of the present invention for a dual-mode electronic headset 100. Headset 100 includes a communications module 105, a battery 110, an equalizer/amplifier 115, a speaker 120, a mode selector/interface 125, an ambient noise microphone 130, a local microphone 135, a remote microphone 140, and a microphone selector 145.

Communications module 105, powered by battery 110, includes a microprocessor/microcontroller and memory for controlling headset 100 as well as signal processing and transceiver functions. Communications module 105 of the preferred embodiment operates its transceiver function using a wireless signaling protocol (e.g., Bluetooth®) for sending and receiving electronic signals to and from a second electronic device (e.g., a smartphone also using a "paired" Bluetooth® communications channel or the like). Of course, other devices and other wired/wireless protocols may be used.

Amplifier 115 is coupled to an output of communications module for receipt of local audio stream. Amplifier 115 is preferably a multiband equalizer that may be configured by the user in any of the operational modes (and in some embodiments, each mode has its own set of equalizer settings). Amplifier 115 permits the user to adjust the gain of various frequency bands of the affected electronic signals, each representing an audio stream that typically has a range of frequencies. Amplifier 115 amplifies/equalizes the local audio stream from communications module 105 to produce a processed local audio stream. Amplifier 115 drives speaker 120 with the processed local audio stream from communications module 105. Speaker 120 is an electroacoustic transducer that converts an electrical signal into sound. The speaker pulses in accordance with the variations of an electrical signal and causes sound waves to propagate through air or bone (e.g., skull bone) to the eardrum of the wearer.

Mode selector/interface 125 controls operation of headset 100 through a connection to communications module 105. Mode selector 125 permits the user to set operational modes of headset 100, volume control, on/off and other functional input. Mode selector 125 may be a single control system or distributed across several different control elements.

Headset 100 includes multiple microphones. A first optional microphone, ambient microphone 130 mounted on a "backside" of headset 100, is used by communications module to pickup "ambient" noise and is used by communications module to filter out the ambient noise from the audio streams. Communications module 105 includes a digital signal processor (DSP) that basically subtracts the signal from ambient microphone 130 from the input signal streams coming others of the microphones. This DSP may then further clean the signals and amplifier/equalizer 115 may further process the signals according to various presets associated with the operational mode.

Headset 100 includes two additional microphones that are important to embodiments of the present invention. Local microphone 135 is mounted in a housing of headset 100 to pickup sounds made by the wearer of headset 100. Remote microphone 140 is mounted in a housing of headset 100 to pickup sounds made by an audio source (e.g., another person) located at a distance from the wearer. For example, the preferred embodiments focus to distance of up to about 3-5 feet. Local microphone 135 and remote microphone each generate an electronic signal from their audio sources and direct these electronic signals to microphone selector 145. The microphones include one or more an acoustic-to-electric transducers or sensors that convert sound into an electrical signal by electromagnetic induction (dynamic microphone), capacitance change (condenser microphone), piezoelectric generation, or light modulation to produce the signal from mechanical vibration.

A selector signal from communications module 105 is provided to microphone selector 145 to select one of the electronic signals sent from microphone selector 145 to communications module 105. In a first operational mode, the selector signal chooses the electronic signal from local microphone 135. In a second operational mode, the selector signal chooses the electronic signal from remote microphone 140.

In operation, a user wears headset 100 against the head which locates speaker 120 near one of the ear canals and positions the various microphones towards various audio sources. Ambient microphone 130 focuses to the area around the wearer's head, that is, the "ambient" sounds. Local microphone 135 is focused on the wearer's mouth and remote microphone 140 is focused to a short distance in front of the wearer's mouth.

Headset 100 has multiple operational modes, that may be manually or automatically selected. Manual selection is made by operation of mode select 125 (automatic selection is described below). In a first operational mode, communications module 105 selects the electronic signal from local microphone 135. This electronic signal is processed, for example, by subtracting out the ambient noise, and then communications module transmits (wired/wirelessly) the processed electronic signal from local microphone to a second electronic device discrete from headset 100. Second electronic device may be a paired cellular telephone or other device. This processed signal sent to the second electronic device is mostly audio sounds from the wearer's mouth.

In a second operational mode, communications module 105 selects the electronic signal from remote microphone 140. This electronic signal is processed, for example, by subtracting out the ambient noise, and then communications module transmits (wired/wirelessly) the processed electronic signal from remote microphone 140 to speaker 120 through amplifier 115. This processed signal sent to speaker 120 is mostly audio sounds from the audio source a short distance in front of the wearer's mouth.

The first operational mode is a configuration that may be employed for an active telephone call that the user is having with a third party through use of a paired/connected cellular telephone for example. Audio signals from the wearer are converted to electronic signals by local microphone 135 and transmitted to the cellular telephone to be sent to the other participants of the call. Electronic signals from the other participants are received at the cellular phone and sent to headset 100 where communications module extracts an audio signal from incoming telephone signal and directs it to speaker 120 through amplifier 115. Thus, the wearer participates in a two-way communication channel with the telephone call participants.

The second operational mode is a configuration that may be employed to assist the wearer is conversing with a person standing in front of them, among other uses. Remote microphone 140 focuses on the audio signals from the person standing in front of the wearer and converts these audio signals to electronic signals that are directed to communications module 105. Rather than transmit the electronic signal from remote microphone 140 to the paired second electronic device, communications module 105 directs the electronic signal to speaker 120 through amplifier 115. The electronic signal is re-audiblized (as frequency equalized and amplified as desired by the wearer) to the ear of the wearer. Thus the wearer is better able to hear what the person standing in front is saying.

Some embodiments of the present invention include a third operational mode. In this mode, electronic signals from remote microphone 140 are transmitted to the second electronic device rather than to speaker 120. This third operational mode permits the wearer to share remote audio sounds with participants in a telephone call, for example. Some implementations may liken this third operational mode to a "reporter" mode in which the wearer shares remote sounds with the participants rather than what the wearer is saying. For example, when part of a large crowd generating significant sound, rather than holding up a handset after saying "Listen to this"—the wearer may simply switch handset 100 into the third operational mode to focus on the audio signals from the crowd.

As described above, the wearer may manually select the desired operational mode by operating mode select 125. Alternatively, headset 100 includes an automatic selection mode in which the headset chooses the applicable operational mode. For example, should an active link be established between headset 100 and the second electronic device, such as would be the case with a "live" telephone conversation, headset 100 will be placed into the second operational mode by communications module 105. When there is not active link, and hence no ongoing telephone call, communications module 105 places headset 100 into the first operational mode.

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system shown in FIG. 2, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, C#, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A multi-mode electronic headset, the headset comprising:

a firsts housing including a power source, said housing configured to be worn on a head of a user;

a local microphone mounted within said first housing and configured to receive a first audio input provided by said user and to generate a first electronic signal from said first audio input;

a remote microphone mounted within said first housing and configured to receive a second audio input provided by an audio source remote from said user and to generate a second electronic signal from said second audio input;

a microphone selector, mounted within said first housing and responsive to a mode selector signal to select one of said electronics signals as a communications signal;

a communications system including a transceiver function to send an outgoing remote audio signal and to receive an incoming remote audio signal with respect to an electronic device disposed within a second housing independent from said first housing, said communications system further including an input coupled to said microphone selector and an output to provide a local audio signal;

an audibilizer mounted within said first housing and having an electroacoustic transducer coupled to said output of said communications system to produce an audible signal for said user from said local audio signal; and a mode selector to select one of a first operational mode and a second operational mode for said communications system and said microphone selector;

wherein said first operational mode selects said first electronic signal as said communications signal with said communications system routing said communications signal to said electronic device as said outgoing remote audio signal and routing said incoming remote audio signal to said output; and wherein said second operational mode selects said second electronic signal as said communications signal with said communications system routing said communications signal to said output.

2. The electronic headset of claim 1 wherein said communications system includes a wireless signaling protocol for said transceiver function when communicating with said electronic device.

3. The electronic headset of claim 1 wherein said audibilizer includes an amplifier to process said local audio signal prior to producing said audible signal for said user.

4. The electronic headset of claim 3 wherein said amplifier includes a multiband equalizer to adjust a gain for each band of a plurality of frequency bands of the local audio signal.

5. The electronic headset of claim 4 wherein said communications system includes a wireless signaling protocol for said transceiver function when communicating with said electronic device.

6. The electronic headset of claim 1 further comprising an ambient noise microphone mounted within said first housing and coupled to said communications system to produce an ambient noise signal and wherein said communications system includes a digital signal processor to adjust said communications signal using said ambient noise signal.

7. The electronic headset of claim 5 further comprising an ambient noise microphone mounted within said first housing and coupled to said communications system to produce an ambient noise signal and wherein said communications system includes a digital signal processor to adjust said communications signal using said ambient noise signal.

8. The electronic headset of claim 1 wherein said mode selector selects from a third operational mode, said third operational mode selecting said second electronic signal as said communications signal with said communications system routing said communications signal to said electronic device as said outgoing remote audio signal and routing said incoming remote audio signal to said output.

9. The electronic headset of claim 7 wherein said mode selector selects from a third operational mode, said third operational mode selecting said second electronic signal as said communications signal with said communications system routing said communications signal to said electronic device as said outgoing remote audio signal and routing said incoming remote audio signal to said output.

10. A method for operating a multi-mode headset, the method comprising:
   (a) receiving, using a local microphone coupled to a first housing configured to worn by a user, a first audio input provided by said user;
   (b) generating a first electronic signal from said first audio input;
   (c) receiving, using a remote microphone coupled to said first housing, a second audio input provided by an audio source remote from said user;
   (d) generating a second electronic signal from said second audio input;
   (e) selecting one of said electronics signals as a communications signal;
   (f) transmitting, using a transceiver function of a communications system, an outgoing remote audio signal to an electronic device disposed within a second housing independent from said first housing;
   (g) receiving, using said transceiver function, an incoming remote audio signal from said electronic device;
   (h) providing a local audio signal from said communications system;
   (i) producing an audible signal for said user from said local audio signal; and
   (j) selecting one of a first operational mode and a second operational mode;
   wherein said first operational mode includes step (e) selecting said first electronic signal as said communications signal and thereafter routing said communications signal to said electronic device as said outgoing remote audio signal and routing said incoming remote audio signal as said local audio signal; and
   wherein said second operational mode includes step (e) selecting said second electronic signal as said communications signal with said communications system routing said communications signal to said output.

11. The method of claim 10 wherein said communications system includes a wireless signaling protocol for said transceiver function when communicating with said electronic device.

12. The method of claim 10 wherein said audibilizer includes an amplifier to process said local audio signal prior to producing said audible signal for said user.

13. The method of claim 12 wherein said amplifier includes a multiband equalizer to adjust a gain for each band of a plurality of frequency bands of the local audio signal.

14. The method of claim 13 wherein said communications system includes a wireless signaling protocol for said transceiver function when communicating with said electronic device.

15. The method of claim 10 further comprising an ambient noise microphone mounted within said first housing and coupled to said communications system to produce an ambient noise signal and wherein said communications system includes a digital signal processor to adjust said communications signal using said ambient noise signal.

16. The method of claim 14 further comprising an ambient noise microphone mounted within said first housing and coupled to said communications system to produce an ambient noise signal and wherein said communications system includes a digital signal processor to adjust said communications signal using said ambient noise signal.

17. The method of claim 10 wherein said mode selector selects from a third operational mode, said third operational mode selecting said second electronic signal as said communications signal with said communications system routing said communications signal to said electronic device as said outgoing remote audio signal and routing said incoming remote audio signal to said output.

18. The method of claim 16 wherein said mode selector selects from a third operational mode, said third operational mode selecting said second electronic signal as said communications signal with said communications system routing said communications signal to said electronic device as said outgoing remote audio signal and routing said incoming remote audio signal to said output.

* * * * *